United States Patent [19]

Abe et al.

[11] Patent Number: 4,583,175
[45] Date of Patent: Apr. 15, 1986

[54] METHOD AND APPARATUS OF IGNITION TIMING CONTROL

[75] Inventors: Osamu Abe; Yasunori Mouri; Noboru Sugiura, all of Katsuta, Japan

[73] Assignee: Hitachi, Ltd., Tokyo, Japan

[21] Appl. No.: 502,946

[22] Filed: Jun. 10, 1983

[30] Foreign Application Priority Data

Jun. 11, 1982 [JP] Japan .................................. 57-99325

[51] Int. Cl.⁴ ............................. F02P 5/04; F02P 5/14
[52] U.S. Cl. .................................... 364/431.08; 73/35; 123/425
[58] Field of Search ...................... 364/431.05, 431.08; 123/416, 417, 425; 73/35

[56] References Cited

U.S. PATENT DOCUMENTS

| 4,268,910 | 5/1981 | Omori et al. | 364/431.08 |
| 4,356,551 | 10/1982 | Iwase et al. | 364/431.08 |
| 4,367,531 | 1/1983 | Furuhashi et al. | 364/431.08 |
| 4,387,588 | 6/1983 | Kaji | 73/35 |
| 4,416,235 | 11/1983 | Utsumi et al. | 73/35 X |
| 4,471,736 | 9/1984 | Yoshida et al. | 123/425 |
| 4,477,875 | 10/1984 | Suzuki et al. | 364/431.08 |
| 4,481,924 | 11/1984 | Kobayashi | 73/35 X |

Primary Examiner—Felix D. Gruber
Attorney, Agent, or Firm—Antonelli, Terry & Wands

[57] ABSTRACT

An ignition timing control method compensates for the variations in characteristic among different knock sensors and for the aging of a knock sensor of an engine by detecting the output of the knock sensor under an engine operating condition which is less conductive to knocking phenomenon, e.g., the idling operation, comparing the detected sensor output with a plurality of preliminarily stored reference values to detect and store the sensitivity of the sensor, computing an amount of retard in accordance with a knock intensity detected under a knock control condition and the stored sensor sensitivity, obtaining a correction amount in accordance with the retard amount, and correcting a basic ignition timing in accordance with the correction amount thereby determining a final ignition timing, and an apparatus carrying out the method.

6 Claims, 14 Drawing Figures

METHOD AND APPARATUS OF IGNITION TIMING CONTROL

The present invention relates to an ignition timing control method and an apparatus therefore, and more particularly to an ignition timing control method and an apparatus so designed that when the engine knocks, the ignition timing of the engine is adjusted by controlling it in accordance with the knock intensity.

Various attempts have been made to improve the fuel economy and it has been considered that the combustion of lean mixtures and increasing of the engine compression ratio are particularly effective. Under these engine conditions, however, the engine tends to knock thus deteriorating the running performance, decreasing the power output of the engine due to the production of a counter torque and damaging the engine due to its overheating. The occurrence of knocking in the engine has a close relation with the ignition timing and it is known that from the engine characteristic point of view the maximum engine power output can be obtained by setting the ignition timing or the ignition advance angle on a slightly retard side with respect to the knock limiting value. To decrease the ignition advance angle for the prevention of knocking results in a decrease in the engine power output. Therefore, it is desirable to control the ignition timing to retard it slightly with respect to the knock limiting value. Particularly, in the case of an engine equipped with a turbocharger, the compression ratio is high and consequently it is desirable to control the ignition timing at the optimum so as to maintain the maximum efficiency. Thus, with conventional ignition timing control systems using a knock sensor, a knock control has been used in which the condition of knocking is detected to adjust the ignition timing.

This type of knock control apparatus uses a method in which a knock signal is detected from the output a knock sensor by masking its noise components due to ignition operation and the ignition timing is retarded a predetermined angle in accordance with the knock signal. In other words, it uses a control method in which the ignition timing is retarded a predetermined amount (e.g., 0.4 degrees) in response to detection of knocking between successive ignition timings and the ignition timing is advanced by a predetermined angle in response to detection of no knock signal. With this knock control, it is very important that the sensor for detecting knocking operates reliably. However, great variations in characteristic are caused among sensors during their manufacture and the elimination of such variations requires a considerable expense. Also, the aging of the sensor is generally affected by external conditions, such as, the use conditions of the engine and the mounting environment of the sensor and there are cases where the full display of the knock control function is prevented due to the aging of the sensor.

It is therefore the primary object of the present invention to provide an ignition timing control method capable of compensating for variations in the sensitivity of a knock sensor.

It is another object of the present invention to provide an apparatus for carrying out the above-mentioned method.

Thus, in accordance with the invention, under an engine operating condition where there is less of a tendency for the occurrence of knocking phenomenon the output of a knock sensor is detected thereby detecting and storing the sensitivity of the knock sensor. Then, under a knock controlling condition an ignition timing correction amount is computed in accordance with the knock intensity derived from the output of the knock sensor and the sensitivity of the knock sensor so that the basic ignition timing is corrected in accordance with the ignition timing correction amount and the final ignition timing is computed.

The present invention will become more apparent from the following description taken in conjunction with the accompanying drawings, in which.

The present invention will now be described with reference to the illustrated embodiments.

Figure 1:
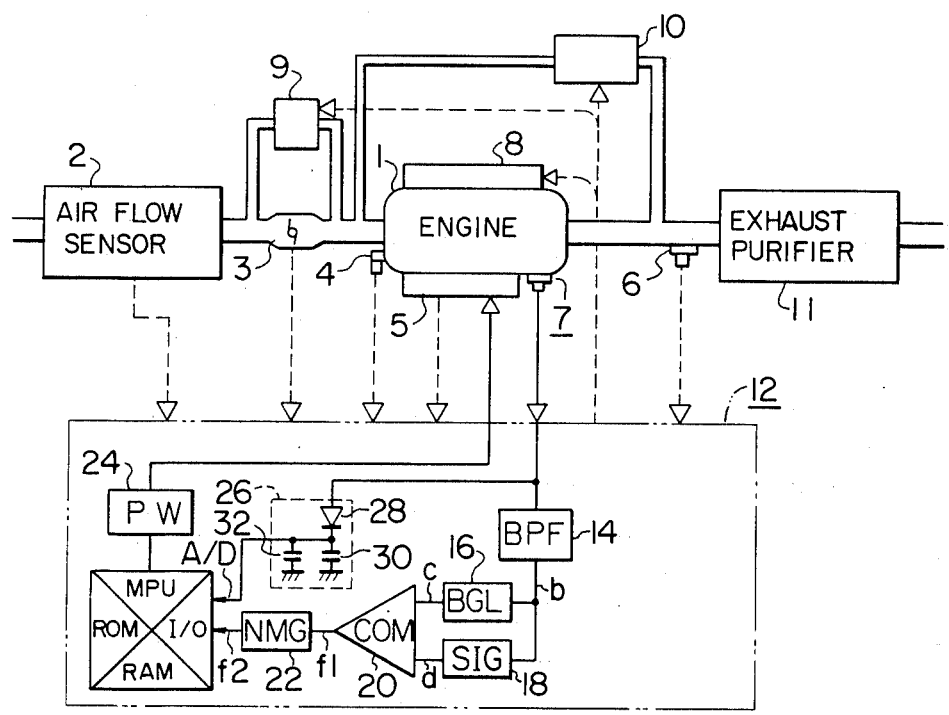
FIG. 1 is a schematic block diagram showing the overall construction of an embodiment of this invention.

Referring to FIG. 1, there is illustrated an embodiment of the invention. Positioned in the intake pipe of an engine 1 are a sensor 2 for sensing the amount of air flow to the engine 1 and a throttle valve 3 for controlling the amount of air flow to the engine 1, and a control valve 9 is mounted in the middle portion of a pipe interconnecting the upstream and downstream sides of the throttle valve 3. Also, an exhaust purifier 11 is mounted in the exhaust pipe of the engine 1, and an exhaust gas sensor 6 for sensing the air-fuel ratio from the exhaust gas composition is mounted in the exhaust pipe upstream of the exhaust purifier 11. A portion of the exhaust gas is returned to the intake pipe through a control valve 10. Also mounted on the engine 1 are a cooling water temperature sensor 4, a knock sensor 7 for sensing the vibrations in the engine 1, an ignition system 5 including an ignition coil for producing an ignition voltage and an angle sensor for sensing rotational angles of the engine 1, a fuel control system 8, etc. A control circuit 12 including a microcomputer is constructed so that the necessary computational operations are performed on the basis of the signals from the above-mentioned sensors as inputs and the fuel control system 8, the ignition system 5 and the control valves 9 and 10 are operated thus operating the engine 10. Particularly, the knock sensor 7 converts the engine vibrations into an electric signal and the output signal is processed in a section of the control circuit 12 including a band-pass filter (BPF)14, a background circuit (BGL)16, a signal amplifier (SIG)18, a comparator (COM)20 and a noise mask gate (NMG)22 for removing the undesired noise such as ignition noise and the resulting signal is subjected to calculating operation by a digital computer including an MPU, ROM, RAM and I/O. The output of the control circuit 12 is applied to the ignition system 5 through a driver circuit (PW)24 for controlling the ignition timing.

On the other hand, the signal from the knock sensor 7 is applied through a smoothing circuit 26 to the input port of an A/D converter included in the I/O circuit. The smoothing circuit 26 includes a diode 28, a capacitor 30 and a resistor 32 so that the sensor output is rectified by the diode 28 and the rectified output is smoothed out by a charging and discharging circuit including the resistor 32 and the capacitor 30.

Figure 2:
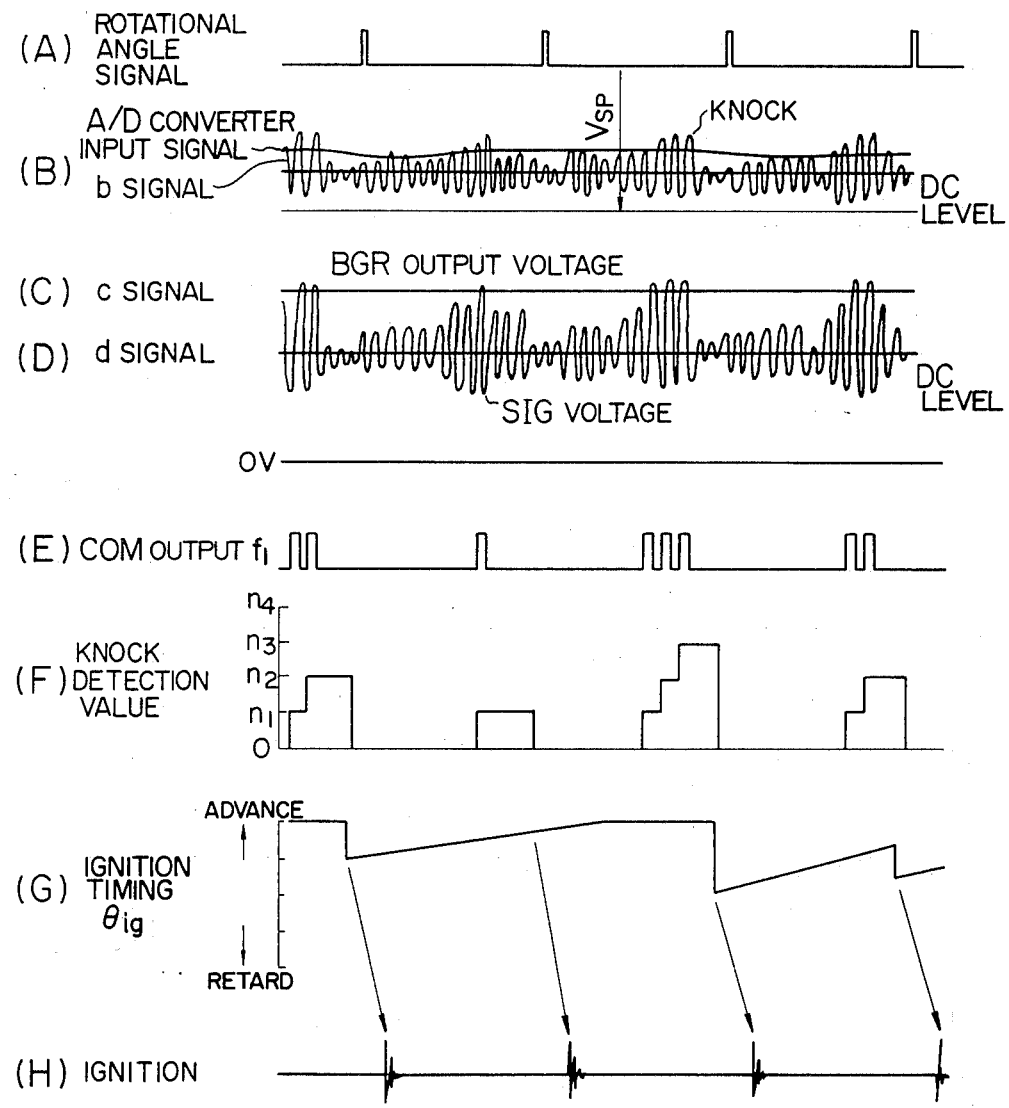
FIG. 2A to 2H are time charts showing the signal waveforms generated at various points in FIG. 1.

The ignition system 5 includes a rotational angle sensor which produces an output, as shown in FIG. 2(A), such that a pulse is generated for every 180 degree rotation of the engine crankshaft in the case of a four-cylinder engine and a pulse is generated for every 120 degree rotation of the crankshaft in the case of a six-cylinder engine.

In FIG. 1, the BPF 14 is a filter having the function of passing that range of frequencies where knock occurs, that is, the range of frequencies around 7 kHz. With the output from the knock sensor 7, the frequencies around 7 kHz are passed through the filter 14. Shown in FIG. 2(B) are the waveforms of the input signal to the A/D converter and the output b applied to the BPF 14. The signal b is applied to the background circuit BGL 16 which integrates and averages the signal thereby generating a signal c, as shown in FIG. 2(C), to the comparator COM 20. The signal b is also applied to the amplifier SIG 18, which amplifies the signal thereby to generate a signal d as shown in FIG. 2(D). The signals c and d are compared in the comparator COM 20 with each other so that when the BGL output voltage c is exceeded by the SIG output voltage d, an output pulse signal f1 or a pulse train is generated as shown in FIG. 2(E). The pulse train f1 is applied to the noise mask gate MG 22. The pulse signal f1 may include, in addition to a component representative of the knocking condition, noise components due to an ignition signal and/or the natural vibrations of the engine or the vehicle. The NMG 22 is used to remove the noise components from the output signal f1 of the comparator COM 20, thereby to produce a signal f2. FIG. 2(E) especially shows the case where the signal f1 includes no noise components and hence the signal f2 has the same waveform as that of the signal f1. The removal of noise components due to the ignition operation may be carried out by preventing the NMG 22 from generating the pulses for a predetermined period of time or a predetermined angle after each ignition. Also, the removal of the noise components due to vibration of the engine is effected by allowing only those pulses higher than a predetermined vibration detection level to pass through the NMG 22. The output f2 from the noise mask gate NMG 22 is applied to the I/O circuit in the digital computer and the pulses are counted by a counter provided in the I/O circuit. The result of this counting is shown in FIG. 2(F). The count value of the I/O circuit is taken as a knock detection value for an interruption process in response to each rotational angle signal shown in FIG. 2(A). Immediately thereafter, the count value of the I/O counter is reset.

Then, the amount of retard angle $\theta_{KNP}$ corresponding to the count value is computed by using a predetermined characteristic table which will be described later with reference to FIG. 4 and the result of this computation is used to compute a correction amount $\theta_{KN}$ which will be described later with reference to FIG. 6. The correction amount $\theta_{KN}$ is added to an ignition timing $\theta(N,L)$ computed in accordance with the engine operating conditions, thereby producing a final ignition timing as shown in FIG. 2(G). In accordance with this final ignition timing, an ignition signal is supplied to the engine, as shown in FIG. 2(H). Thus, the knock information is used to control the ignition timing which occurs subsequent to obtaining the knock information.

Figure 6:
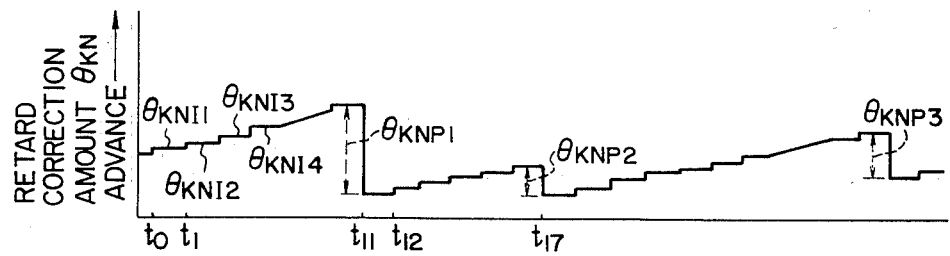
FIG. 6 is a diagram useful for explaining the computation of a correction amount.

Under the conditions where the occurrence of a knock is not detected, as shown at $\theta_{KNJ1}$, $\theta_{KNJ2}$ ... in FIG. 6, the correction amount $\theta_{KN}$ is corrected by a predetermined advance angle per unit time in a direction to advance the ignition timing and thus the ignition timing is controlled to advance. Note that the addition of the angles $\theta_{KNJ1}$, $\theta_{KNJ2}$, ... of FIG. 6 or the correction of the correction amount $\theta_{KN}$ in the advancing direction may be performed at intervals of a predetermined engine rotation.

Figure 3:
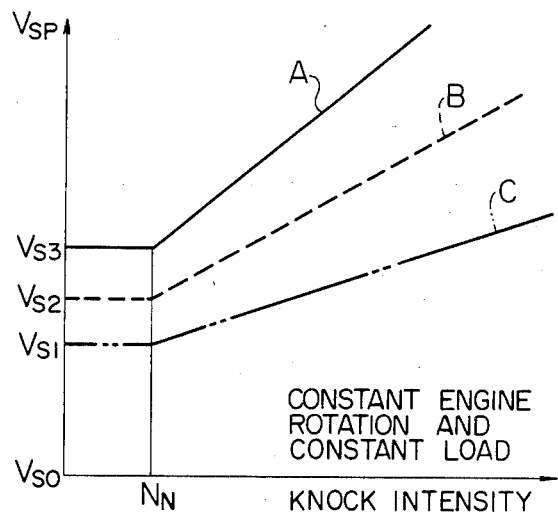
FIG. 3 is a comparative knock sensor sensitivity diagram.

The relation between the vibrations due to the knocking condition and the output of the sensor 7 varies in dependence on the sensor sensitivity and the sensor mounting position, etc. FIG. 3 shows the relationship between an output of each of knock sensors A, B and C having high, intermediate and low sensitivities and a knock intensity under the condition of constant engine rotation and constant load. A point $N_N$ indicates a threshold point at which the occurrence of knocking begins, that is, the region lower than the point $N_N$ is a non-knocking region where the output of each sensor is at a substantially constant level and the region higher than the point $N_N$ is a knocking region where the output of each sensor gradually inceases with increase of the knock intensity. The sensor outputs at the point $N_N$ are not the same, that is, the sensors A, B and C show different values $V_{S3}$, $V_{S2}$ and $V_{S1}$, respectively. In other words, the sensor output at the knock threshold point differs with different sensor sensitivities. Moreover, even the sensitivity of the same sensor varies due to its aging and thus the sensor output at the knock threshold point varies depending on the aging of the sensor. Note that while, in the region below the knock threshold point, the sensor outputs vary so as to decrease gradually, this is due to the changes in the engine speed and therefore the sensor outputs will remain unchanged if the engine speed is constant. It will be seen from these facts that the previously mentioned knock detection value for the same knock intensity varies considerably depending on the sensor sensitivity.

Thus, on the basis of certain values of the previously mentioned sensor sensitivities under a given operating condition, e.g., an idling operation where there is no possibility of knocking, such as, the reference values $V_{S3}$, $V_{S2}$ and $V_{S1}$ of the A, B and C curves in FIG. 3, an output value $V_{SX}$ of a sensor may be detected by the A/D converter in the I/O circuit under the same operating condition thereby detecting the sensor sensitivity.

Figure 4:
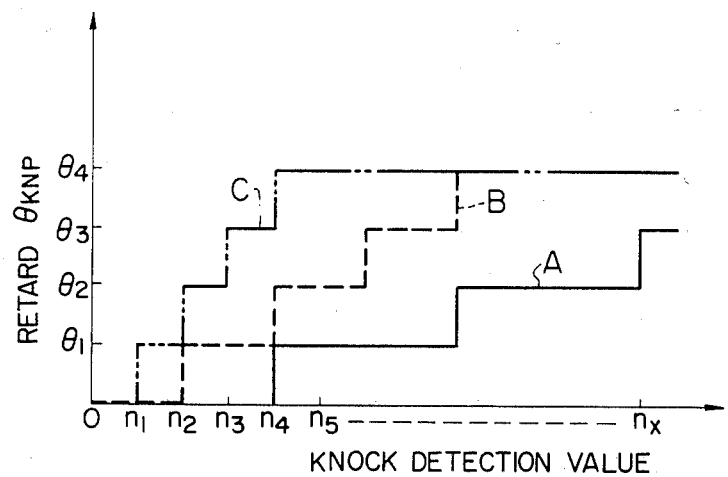
FIG. 4 is a characteristic diagram showing the relationship between the knock intensity and the amount of retard.

FIG. 4 illustrates the relation between the detected knock intensity and the ignition timing correction value $\theta_{KNP}$ for each sensor, which is stored as a table of knock detection value versus retard correction amount $\theta_{KNP}$ for each of the characteristics A, B and C in the ROM. As shown in FIG. 4, the retard correction amount $\theta_{KNP}$ corresponding to the detection value under the knocking condition is determined on the basis of one of the characteristics A, B and C which is determined from the signal value $V_{S1}$, $V_{S2}$ or $V_{S3}$ as produced by the sensor under the no-knocking condition of the engine. In the case of a high sensitivity such as the sensor sensitivity A of FIG. 3, the amount of retard corresponding to the detection value is reduced in inverse proportion to the sensitivity. In the case of a low sensitivity such as the sensor sensitivity C, the retard amount corresponding to the detection value is increased comparatively.

In other words, in the case of the high knock sensor sensitivity shown at A, when the knock detection value or the number of the counted knock signal pulses as shown in FIG. 2(E) is four, the retard amount $\theta_{KNP}$ for the ignition timing is selected to be, for example, 0.4 degrees (this value is referred to as one retard amount and is represented by $\theta_1$). Also, in the case of the intermediate knock sensor sensitivity shown at B, when the knock detection value or the number of the counted pulses is two, the retard amount is selected to be $\theta_1$. Further, in the case of the low knock sensor sensitivity shown at C, the retard amount is selected to be one retard amount per one knock signal pulse.

Figure 7:
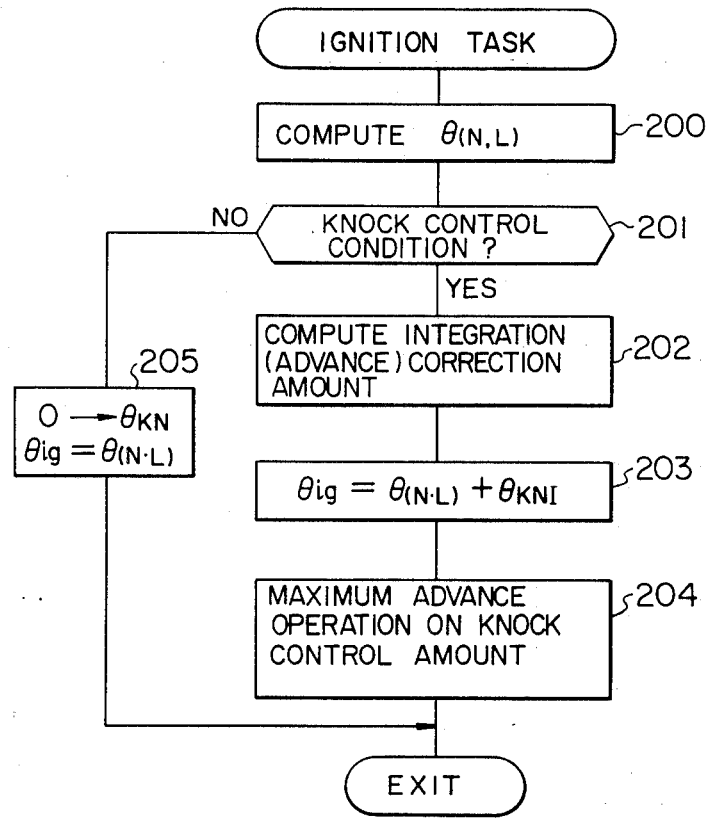
FIG. 7 is a flow chart showing the method of computing an integration part of the correction amount and computing the final ignition timing.

Next, the ignition timing correction control will be described with reference to the flow charts shown in FIGS. 5 and 7.

Figure 5:
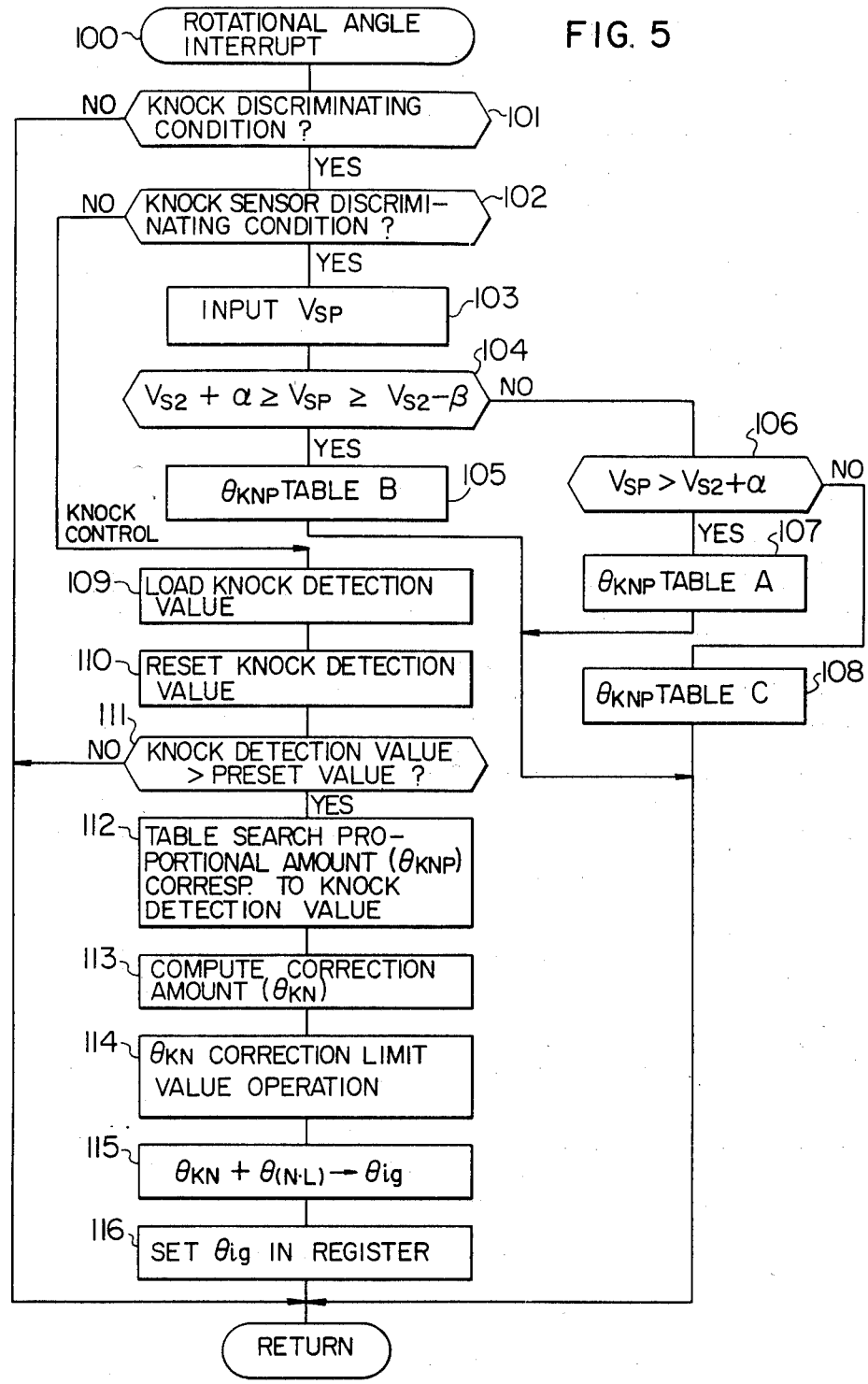
FIG. 5 is a flow chart showing the method of computing a knock sensor sensitivity and an amount of retard.

FIG. 5 shows the flow chart for an ignition timing correction control according to a rotational angle interruption. The program shown by this flow chart is executed in response to each of the pulses shown in FIG. 2(A).

First, when a step 100 determines that a rotational angle interrupt has occurred, a step 101 is carried out to determine whether the engine is at a steady-state operation for knocking condition discriminating purposes, that is, whether the engine cooling water temperature has attained a predetermined value. If the step 101 determines that the knock discriminating condition has been established, a step 102 is carried out to determine whether the engine is at a knock sensor discriminating condition or the engine is idling. If the step 101 determines that the knock discriminating condition has not been set up, the process is returned to wait for the next interruption. If the step 102 determines that the engine is at the knock sensor discriminating condition, that is, the engine is idling, a step 103 is carried out. The step 103 inputs the A/D converter output and a step 104 determines whether the sensitivity of the sensor used has the characteristic B of FIGS. 3 and 4. More specifically, the step 104 determines whether the sensor output $V_{SP}$ inputted from the A/D converter is derived from a sensor having the characteristic B by checking whether the value of $V_{SP}$ is within the following range $$V_{S2} + \alpha \geq V_{SP} \geq V_{S2} - \beta$$

where $\alpha = (V_{S3} - V_{S2})/2$ and $\beta = (V_{S2} - V_{S1})/2$.

On the other hand, if the determination of the step 104 is YES, a step 105 selects the characteristic B of the $\theta_{KNP}$ tables in FIG. 4 for the computation of the correction amount $\theta_{KN}$ and stores the selection in the RAM. If the determination of the step 104 is NO, then a step 106 determines whether the following condition is satisfied $$V_{SP} > V_{S2} + \alpha$$

If the step 106 determines that the condition is met, a step 107 stores in the RAM the selection of the table A (shown by A in FIG. 4) to be used for the computation of the correction amount $\theta_{KN}$. If the step 106 determines that the condition is not satisfied, a step 108 stores in the RAM the selection of the table C (shown by C in FIG. 4) to be used for the computation of correction amount $\theta_{KN}$.

Thus, when the engine is idling, it is determined by the step 105 or 107 or 108 as to which of the characteristic tables A, B and C is to be used and then the process returns to wait for the next interrupt. It should be noted that when the step 101 determines that the engine is at the knock discriminating condition, that is, the engine cooling water is at a predetermined temperature and also the step 102 determines that the engine is at idling, the engine should be at a condition which is adapted to determine the characteristics in sensitivity of the knock sensor. After the sensitivity characteristics of the sensor has been determined, the system is ready for carrying out the ignition timing control in accordance with the output of the knock sensor, if the engine is driven at a condition where knocking may appear. If the step 102 determines that the engine is not at the sensor discriminating condition, that is, the engine is not idling, this indicates that the engine is driven at a speed higher than idling and hence knocking may appear. Thus, the process proceeds to a step 109.

The step 109 loads the I/O counter count value or the knock detection value. Then, a step 110 resets the knock detection value stored in the counter of the I/O circuit.

Then, a step 111 determines whether the knock detection value (the number of knock pulses) is greater than a predetermined value, which corresponds to the value of $n_1$ or $n_2$ or $n_4$ in FIG. 4 depending on which table is selected. If the knock detection value is greater, a step 112 is carried out to obtain the proportional amount ($\theta_{KNP}$) corresponding to the knock detection value from the selected table in the ROM determined by the step 105, 107 or 108. This proportional amount $\theta_{KNP1}$ represents a retard amount for the ignition timing such as one shown in (G) of FIG. 2.

Then, a step 113 computes a correction amount $\theta_{KN}$. This computation is performed by reading the preceding correction amount from the RAM and correcting this correction amount $\theta_{KN}$ in the retarding direction by the computed value of the step 112. This corresponds for example to the correction at times $t_{11}$ and $t_{17}$, respectively, of FIG. 6. A step 114 performs a correction limit value operation on the correction amount $\theta_{KN}$, and a step 115 adds the correction amount $\theta_{KN}$ to an ignition timing $\theta(N,L)$ computed in accordance with the engine operating conditions thereby computing a final ignition timing $\theta_{ig}$. A step 116 sets the final ignition timing $\theta_{ig}$ in the register.

As described so far, the final ignition timing $\theta_{ig}$ is determined by utilizing the ignition timing determined in accordance with the engine operating conditions as a basic ignition timing and correcting the basic ignition timing in accordance with the correction amount $\theta_{KN}$. In this case, the correction amount $\theta_{KN}$ is determined in accordance with two characteristics. One of the characteristics is the proportional amount $\theta_{KNP}$ and this forms the ignition characteristic retard amount component shown in FIG. 2(G). FIG. 6 shows an example of the variation in the correction amount $\theta_{KN}$ characteristic. In accordance with this characteristic, the proportional amount $\theta_{KNP}$ corresponds to the values $\theta_{KNP1}$, $\theta_{KNP2}$ and $\theta_{KNP3}$, respectively, which modify the correction amount $\theta_{KN}$ in the retarding direction. The other characteristic represents a value such as shown by $\theta_{KNI1}$, $\theta_{KNI2}$, $\theta_{KNI3}$, . . . , which modifies the correction amount $\theta_{KN}$ in the advancing direction. This modifying operation will be explained in connection with a step 202 of FIG. 7 which will be described later. Note that the correction limit value operation of the step 114 is such that when the amount of retard provided by each of the proportional values $\theta_{KNP1}$, . . . , $\theta_{KNP3}$ exceeds a predetermined value, the retard amount is limited to the predetermined value and any further retardation is prevented. This has the effect of preventing any rapid change of the ignition timing and ensures a smooth operation of the engine.

Next, the program for the control performed to obtain the basic ignition timing will be described with reference to the ignition task flow shown in FIG. 7. The task of this flow chart is executed at intervals of a predetermined period of time. Firstly, a step 200 computes an ignition timing $\theta$ in accordance with the conditions of the engine, e.g., the speed N and load L of the engine. This computation may for example be performed by storing in the ROM an ignition timing table using the engine speed N and the engine load L as parameters and searching an ignition timing $\theta$ from the table. A step 201 determines whether there is a knock controlling condition. If there is not, a step 205 resets the correction amount $\theta_{KN}$ to zero and the ignition timing determined by the step 200 is outputted as the final ignition timing. On the other hand, if the step 201 determines that there is a knock control condition, a step 202 computes an integration value (advance) and adds it to the preceding correction amount $\theta_{KNI}$, for example $\theta_{KNI1}$ in FIG. 6, stored in the RAM thereby obtaining a new correction amount $\theta_{KNI}$, for example $\theta_{KNI2}$. A step 203 adds the correction amount $\theta_{KNI}$ corrected by the integration value to the ignition timing $\theta(N,L)$ obtained by looking-up the table at the step 200, thereby obtaining a final ignition timing $\theta_{ig}$. A step 204 checks whether the difference between the preceding ignition timing $\theta_{ig}$ and the current ignition timing $\theta_{ig}$ is greater than a predetermined maximum limit and whether the current ignition timing $\theta_{ig}$ is advanced in excess of a predetermined maximum advance angle and the ignition timing $\theta_{ig}$ is maintained within the predetermined value if it is in excess of these predetermined values. In this way, the engine is operated smoothly and any excessive ignition advance due to the absence of knocking phenomenon is prevented.

From the foregoing it will be seen that in accordance with this embodiment the correction amount corresponding to the sensitivity of the knock sensor is determined by the steps 103, 104, 105, 106, 107 and 108 and the final ignition timing is determined in accordance with the correction amount $\theta_{KN}$. This has the effect of accommodating the variations in characteristics among different knock sensors as well as the variations in characteristic due to the aging of the sensor.

In the embodiment of FIG. 5, as shown in FIGS. 3 and 4, the sensor sensitivities are classified into the three ranks A, B and C and the retard amount $\theta_{KNP}$ is determined in accordance with the sensitivities A, B and C, respectively. However, the desired retard amount may be determined by using the interpolation so as to effect the control with a higher degree of accuracy. For example, where the characteristic B is selected by the step 104 and the characteristic of the table shown in FIG. 4 and stored in the ROM is read by the step 105, it is possible to perform a proportional computation in consideration of the difference between the detected A/D converter output $V_{SP}$ and the reference values $V_{S1}$, $V_{S2}$ and $V_{S3}$, respectively, and thereby interpolate the characteristic of FIG. 4 so as to perform the control with a greater accuracy.

In accordance with the present invention, by virtue of the fact that the correction amount corresponding to the sensitivity of a knock sensor is computed and then the final ignition timing is determined in accordance with this correction amount, it is possible to completely accommodate the variations in characteristic among different knock sensors as well as the variations in the characteristic of the same sensor due to the aging and thereby always maintain a stable control performance. Also, there are remarkable effects that the sensor variation control range can be maintained wider than previously by about ±50%, that inexpensive sensors can be provided and so on.

While, in the embodiment described in detail, the sensor sensitivity is detected in accordance with the smoothed value of the vibration waves during the desired operation (the idle operation), this may be replaced with the peak value, and also the same control and the same effect as the present embodiment can be obtained by determining the sensor sensitivity in accordance with the average value of the vibration waves over a predetermined period (angular speed) or the number per unit time of the vibration waves exceeding a desired value.

We claim:

1. An ignition timing control apparatus of an engine comprising:

a knock sensor for producing a knock signal having a characteristic which distinctively changes when the engine is knocking as compared to when the engine is not knocking;

means for comparing the magnitude of the signal produced by said knock sensor when the engine is driven at a predetermined first condition where the engine is generally not knocking with threshold values predetermined according to predetermined different levels of sensitivity of the knock sensor thereby determining to which one of the levels the sensitivity of the knock sensor belongs;

means for detecting an intensity of knocking of the engine from the distinctive change in the characteristic of the signal produced by said knock sensor when the engine is driven at a second condition other than said first condition;

means for determining a basic ignition timing of the engine in accordance with the driving conditions of the engine;

means for selecting one of a plurality of predetermined different functions depending on the determined level of sensitivity of the knock sensor, said functions being predetermined corresponding to said different levels of sensitivity of the knock sensor, respectively, such that each function defines a correction amount of the basic ignition timing as a function of the detected intensity of knocking and a corresponding one of the different levels of sensitivity of the knock sensor;

means for determining the correction amount of the basic ignition timing based on the detected intensity of knocking according to the selected one of the functions; and means for correcting the basic ignition timing by said determined correction amount thereby producing a corrected ignition timing by which the ignition timing of the engine is controlled.

2. A method of controlling an ignition timing depending on a detected knock condition of an engine provided with a knock sensor for producing a knock signal having a characteristic which generally changes distinctively for different knocking intensities when the engine is knocking as compared to when the engine is not knocking, said method comprising the steps of:

determining a level of sensitivity of the knock sensor based on the magnitude of the output signal of the knock sensor produced when the engine is driven at a predetermined first condition where the engine is generally not knocking;

detecting the intensity of knocking of the engine by detecting said distinctive change in the characteristic of the knock signal produced when the engine is driven at a second condition other than said predetermined first condition;

determining a basic ignition timing of the engine in accordance with detected driving conditions of the engine;

determining a correction amount of said basic ignition timing based on the detected intensity of knocking and the determined level of sensitivity of the knock sensor; and correcting said basic ignition timing using said correction amount thereby determining a corrected ignition timing by which the ignition timing of the engine is controlled.

3. A method according to claim 2, wherein the level of sensitivity of the knock sensor is determined by comparing the magnitude of the output signal of the knock sensor produced when the engine is driven at said first condition with threshold values of the magnitude of said output signal according to predetermined different levels in sensitivity of the knock sensor.

4. A method according to claim 3, further comprising the step of advancing the basic ignition timing by a predetermined amount in every predetermined unit time when the engine is driven at said second condition and no distinctive change appears in the characteristic of the knock signal as produced, and wherein the step of correcting the basic ignition timing is carried out by retarding the above-mentioned advanced basic ignition timing by the correction amount determined by the correction amount determining step.

5. A method according to claim 3, further comprising the step of preliminarily preparing a plurality of different functions corresponding to the predetermined different levels of sensitivity of the knock sensor, respectively, such that each function defines the correction amount of the basic ignition timing as a function of the detected intensity of knocking and a corresponding one of the different levels of sensitivity of the knock sensor, and wherein the correction amount of the basic ignition timing is determined based on one of said functions corresponding to the determined level of sensitivity of the knock sensor.

6. A method according to claim 2, wherein the level of sensitivity of the knock sensor is determined based on a digital value converted from an average of the magnitude of the knock signal produced when the engine is driven at said first condition.

* * * * *